United States Patent
Nishimura et al.

(10) Patent No.: US 9,621,035 B2
(45) Date of Patent: Apr. 11, 2017

(54) CONTROL CIRCUIT FOR SWITCHING REGULATOR, INTEGRATED CIRCUIT DEVICE, SWITCHING REGULATOR, AND ELECTRONIC DEVICE

(71) Applicant: SEIKO EPSON CORPORATION, Tokyo (JP)

(72) Inventors: Motoaki Nishimura, Chino (JP); Haruo Hayashi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 17 days.

(21) Appl. No.: 14/217,951

(22) Filed: Mar. 18, 2014

(65) Prior Publication Data

US 2014/0292296 A1 Oct. 2, 2014

(30) Foreign Application Priority Data

Mar. 26, 2013 (JP) .................................. 2013-065112

(51) Int. Cl.
*H02M 1/08* (2006.01)
*H02M 3/155* (2006.01)

(52) U.S. Cl.
CPC ............. *H02M 3/155* (2013.01); *H02M 1/08* (2013.01)

(58) Field of Classification Search
CPC .... H02M 3/145; H02M 3/156; H02M 3/1582; H02M 1/08; H02M 2001/0003; H02M 2001/0006
USPC .................................. 363/78, 79, 80, 81, 83
See application file for complete search history.

(56) References Cited

U.S. PATENT DOCUMENTS

| 4,947,058 A | 8/1990 | Yarbrough et al. |
| 5,438,294 A * | 8/1995 | Smith ........................... 327/384 |
| 7,184,281 B2 * | 2/2007 | Ren ..................... H02M 3/1588 323/355 |
| 2009/0146734 A1 | 6/2009 | Fallah et al. |

(Continued)

FOREIGN PATENT DOCUMENTS

| JP | A-2-31517 | 2/1990 |
| JP | H0360360 A | 3/1991 |

(Continued)

OTHER PUBLICATIONS

Rossberg, Michael, B. Vogler, and R. Herzer. "600V SOI Gate Driver IC with advanced level shifter concepts for medium and high power applications." Power Electronics and Applications, 2007 European Conference on. IEEE, 2007.*

*Primary Examiner* — Fred E Finch, III
*Assistant Examiner* — Jye-June Lee
(74) *Attorney, Agent, or Firm* — Oliff PLC (57) ABSTRACT

Provided are a control circuit for a switching regulator that can switch off a transistor that drives an inductor at high speed, an integrated circuit device, the switching regulator, an electronic device, and the like. A control circuit (100) includes a signal generation circuit (10) and an output circuit (20). The signal generation circuit (10) generates a control signal (SG) for a switching regulator. Upon receiving the control signal (SG), the output circuit (20) outputs a drive signal (GD) to a gate of an N-type transistor (30) that drives an inductor (40). The output circuit (20) outputs a voltage level lower than a source voltage of the N-type transistor (30) as an off-voltage level of the drive signal (GD) for switching off the N-type transistor (30).

20 Claims, 11 Drawing Sheets

(56) References Cited

U.S. PATENT DOCUMENTS

| | | |
|---|---|---|
| 2011/0115803 A1* | 5/2011 | Ozaki .......................... 345/531 |
| 2012/0092536 A1 | 4/2012 | Hirota |
| 2013/0076322 A1 | 3/2013 | Tateno et al. |
| 2015/0280571 A1 | 10/2015 | Tateno et al. |

FOREIGN PATENT DOCUMENTS

| | | |
|---|---|---|
| JP | A-7-115353 | 5/1995 |
| JP | A-2001-237689 | 8/2001 |
| JP | 2006276457 A | 10/2006 |
| JP | 2007006658 A | 1/2007 |
| JP | 2007251699 A | 9/2007 |
| JP | A-2008-103943 | 5/2008 |
| JP | A-2011-4370 | 1/2011 |
| JP | A-2012-95358 | 5/2012 |
| JP | 2013070263 A | 4/2013 |

* cited by examiner

CONTROL CIRCUIT FOR SWITCHING REGULATOR, INTEGRATED CIRCUIT DEVICE, SWITCHING REGULATOR, AND ELECTRONIC DEVICE

The present application claims a priority based on Japanese Patent Application No. 2013-065112 filed on Mar. 26, 2013, the contents of which are incorporated herein by reference.

BACKGROUND

1. Technical Field

The present invention relates to a control circuit for a switching regulator, an integrated circuit device, a switching regulator, an electronic device, and the like.

2. Related Art

A switching regulator that uses an inductor controls an output voltage thereof by controlling on/off of a transistor that drives the inductor. Regarding this on/off control for a transistor, for example, a technique to accelerate the switching by overdrive and the like is known.

For example, JP-A-7-115353, which is an example of related art, discloses a technique in which a transistor for driving an inductor and a control circuit therefor are constituted by a bipolar transistor, and the control circuit is provided with a current source for overdrive. In this way, the control circuit switches on/off the transistor for driving the inductor at high speed.

In the case where a MOS transistor is used as a transistor for driving an inductor, on/off of the transistor is controlled by voltage, and therefore the technique of JP-A-7-115353 cannot be applied. In general, a source voltage of a transistor for driving an inductor is the same as a source voltage of an output unit in a control circuit. When switching off the transistor for driving the inductor, a gate voltage thereof is set to be the same electric potential as the source voltage. However, a problem with this technique is that it is difficult to switch off the transistor at high speed.

SUMMARY

Some aspects of the invention enable provision of a control circuit for a switching regulator that can switch off a transistor that drives an inductor at high speed, an integrated circuit device, the switching regulator, an electronic device, and the like.

One aspect of the invention relates to a control circuit for a switching regulator. The control circuit includes: a signal generation circuit that generates a control signal for the switching regulator; and an output circuit that outputs a drive signal to a gate of an N-type transistor, which drives an inductor upon receiving the control signal. The output circuit outputs a voltage lower than a source voltage of the N-type transistor as an off-voltage level of the drive signal for switching off the N-type transistor.

According to one aspect of the invention, when switching off the N-type transistor that drives the inductor, the drive signal of a voltage level lower than the source voltage of the N-type transistor is output to the gate of the N-type transistor. In this way, the transistor that drives the inductor can be switched off at high speed.

In one aspect of the invention, it is preferable that the output circuit outputs a negative voltage as the off-voltage for switching off the N-type transistor.

In this way, using the source voltage of the N-type transistor that drives the inductor as a reference, a negative voltage with respect to the reference can be output as the off-voltage for switching off the N-type transistor. Consequently, the N-type transistor can be switched off with a voltage lower than the source voltage of the N-type transistor.

In one aspect of the invention, it is preferable that the control circuit further includes a boosting circuit that generates a voltage lower than the source voltage, and that the output circuit outputs the off-voltage for switching off the N-type transistor based on the output from the boosting circuit.

In this way, the boosting circuit built in the control circuit for the switching regulator can supply a voltage lower than the source voltage to the output circuit, and the off-voltage can be output based on the voltage level.

In one aspect of the invention, it is preferable that the boosting circuit is a charge pump type boosting circuit that converts voltage using a switched capacitor circuit.

The charge pump boosting circuit makes integration easy. Therefore, when the control circuit is constituted as an integrated circuit device, the boosting circuit can be built in the integrated circuit device.

In one aspect of the invention, it is preferable that the control circuit further includes a terminal to which a voltage lower than the source voltage is supplied, and that the output circuit outputs the off-voltage for switching off the N-type transistor based on a voltage level on the terminal.

In this way, a voltage lower than the source voltage can be supplied to the output circuit from the outside of the control circuit for the switching regulator, and the off-voltage can be output based on the voltage level.

In one aspect of the invention, it is preferable that the output circuit includes a level shifter that converts the control signal having a voltage level of a high power supply voltage and a voltage level of a low power supply voltage into a signal having a voltage level of the high power supply voltage and a voltage level lower than the source voltage.

In one aspect of the invention, it is preferable that the output circuit further includes a pre-buffer that outputs the drive signal based on the signal from the level shifter.

With the above-referenced configurations according to one aspect of the invention, the control signal output at a voltage level of the high power supply voltage and a voltage level of the low power supply voltage can be shifted, in terms of level, to a signal at a voltage level of the high power supply voltage and a voltage level lower than the source voltage. Then, the signal can be buffered and output to the N-type transistor as the drive signal.

Another aspect of the invention relates to a control circuit for a switching regulator. The control circuit includes: a signal generation circuit that generates a control signal for the switching regulator; and an output circuit that outputs a drive signal to a gate of a P-type transistor, which drives an inductor upon receiving the control signal. The output circuit outputs a voltage higher than a source voltage of the P-type transistor as an off-voltage level of the drive signal for switching off the P-type transistor.

According to another aspect of the invention, when switching off the P-type transistor that drives the inductor, the drive signal of a voltage level higher than the source voltage of the P-type transistor is output to the gate of the P-type transistor. In this way, the transistor that drives the inductor can be switched off at high speed.

A further aspect of the invention relates to an integrated circuit device including the control circuit with any of the above-referenced configurations.

A still further aspect of the invention relates to a switching regulator including the control circuit with any of the above-referenced configurations, the inductor, and the h-type transistor.

A still further aspect of the invention relates to an electronic device including the above-referenced switching regulator.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following describes a preferred embodiment of the invention in detail. Note that the present embodiment described below does not unreasonably limit the contents of the invention described in the attached claims, and not all configurations described in the present embodiment are indispensable as solutions provided by the invention.

1. Comparative Example

Figure 1:
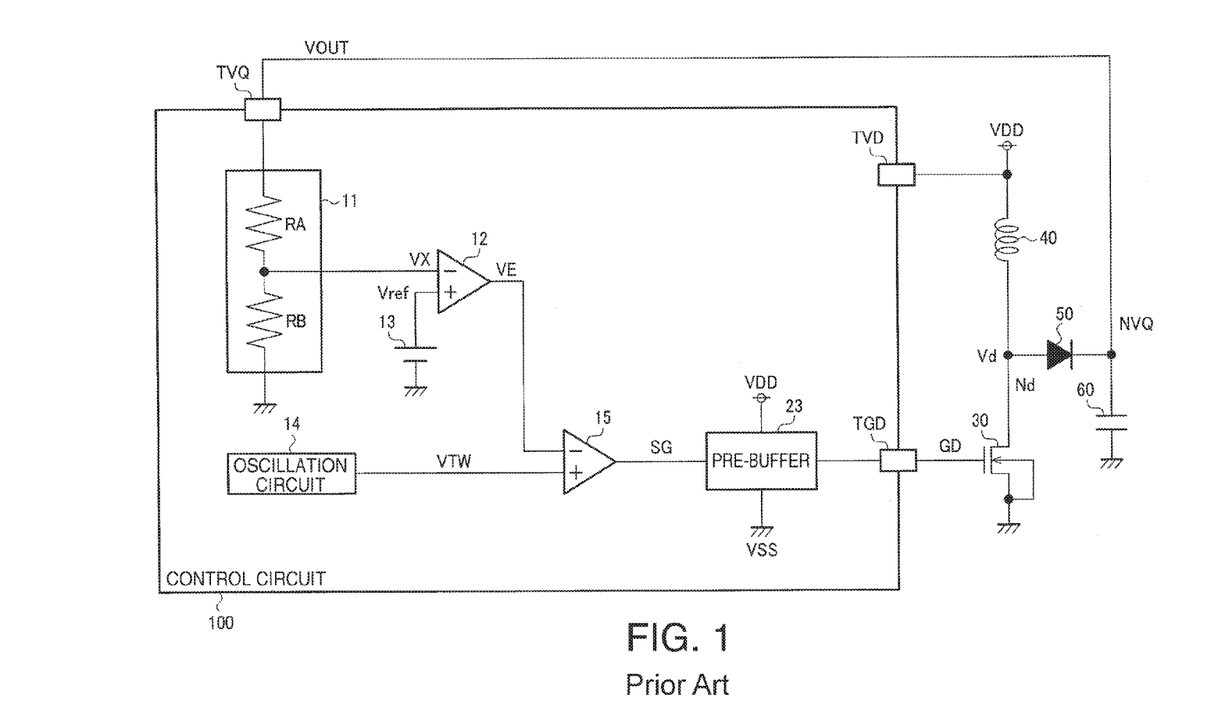
FIG. 1 shows a comparative example of a switching regulator according to a present embodiment.

FIG. 1 shows a comparative example of a switching regulator according to the present embodiment. In the comparative example, the switching regulator includes an N-type transistor 30, an inductor 40, a diode 50, a capacitor 60, and a control circuit 100.

The inductor 40 is disposed between a node of a power supply voltage VDD (high power supply voltage) and a node Nd. The N—type transistor 30 is disposed between the node Nd and a node of a ground voltage VSS (low power supply voltage). A drive signal GD from the control circuit 100 is supplied to a gate of the N-type transistor 30. The diode 50 is disposed between the node Nd and a node NVQ of an output voltage VOUT of the switching regulator. The capacitor 60 is disposed between the node NVQ and the node of the ground voltage VSS.

The control circuit 100 controls on/off of the N-type transistor 30 by outputting the drive signal GD based on the output voltage VOUT of the switching regulator. More specifically, the control circuit 100 includes a voltage dividing circuit 11, an error amplification circuit 12 (error amplifier), a reference voltage generation circuit 13, an oscillation circuit 14 (triangle wave generation circuit), a comparison circuit 15 (comparator), and a pre-buffer 23.

The switching regulator shown in FIG. 1 is a DC-to-DC step-up type voltage converter. The control circuit 100 controls the output voltage VOUT through PWM (pulse-width modulation) control. That is to say, the voltage dividing circuit 11 divides the output voltage VOUT input via a terminal TVQ using resistor elements RA, RB. The error amplification circuit 12 amplifies a difference between the resultant divided voltage VX (=VOUT×RB/(RA+RB)) and a reference voltage Vref from the reference voltage generation circuit 13. Then, the comparison circuit 15 compares an output voltage VE of the error amplification circuit 12 with triangle waves VTW from the oscillation circuit 14, and outputs a control signal SG with rectangular waves. The pre-buffer 23 buffers the control signal SG and outputs the same as a drive signal GD to the gate of the N-type transistor 30 via a terminal TGD.

A pulse width of the drive signal GD is controlled so as to keep the output voltage VOUT of the switching regulator constant. For example, if the output voltage VOUT of the switching regulator decreases, the output voltage VE of the error amplification circuit 12 decreases, with the result that a time period in which the voltage of triangle waves VTW are higher than the voltage VE is prolonged, and a duration of a high level of the drive signal GD increases. Consequently, a time period in which the N-type transistor 30 drives the inductor 40 using current is prolonged, and a larger amount of electric charge is supplied to the capacitor 60. This results in the rise in the output voltage VOUT. On the other hand, if the output voltage VOUT increases, the aforementioned actions are reversed, thus resulting in the fall in the output voltage VOUT.

Figure 2:
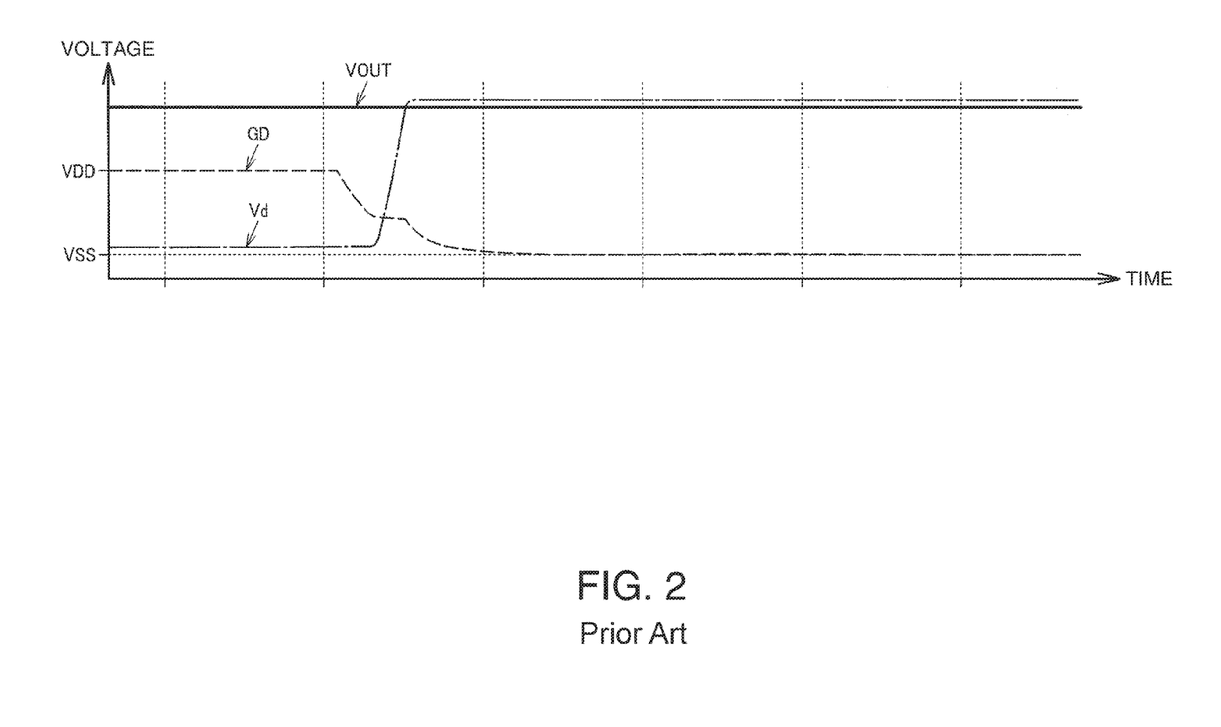
FIG. 2 is a diagram for describing operations in the comparative example.

FIG. 2 shows voltage changes in the drive signal GD and a drain voltage Vd of the N-type transistor 30 when the N-type transistor 30 is switched from on to off in the comparative example.

In the comparative example, the pre-buffer 23 operates with the power supply voltage VDD and the ground voltage VSS, and the low level of the drive signal GD is the ground voltage VSS. In general, the ground voltage VSS is supplied from the outside of the control circuit 100, and is the same as a source voltage of the N-type transistor 30 that drives the inductor 40. That is to say, a gate voltage at the time of switching off the N-type transistor 30 is the same as the source voltage.

When the gate voltage is the same as the source voltage, the gate voltage is merely slightly lower than a threshold voltage of the N-type transistor 30 (for example, approximately 0.7 V). As the N-type transistor 30 has a size sufficient to drive the inductor 40 (for example, a gate capacitance of several hundred pF), driving with such a voltage close to the threshold voltage prolongs a time period until the N-type transistor 30 is switched off. That is to say, as shown in FIG. 2, the waveform of the drive signal. GD, which is the gate voltage, is rounded, and a time period of the shift from the high level (VDD) to the threshold voltage is prolonged. Such rounding of the drive waveform leads to an undesirable decrease in the power efficiency of the switching regulator (the rate of the output voltage to the input voltage of the switching regulator).

Furthermore, once the N-type transistor 30 is switched off, current flows from the inductor 40 into the capacitor 60, and therefore the drain voltage Vd rapidly rises from around the ground voltage VSS to around the output voltage VOUT. Consequently, as shown in FIG. 2, the gate voltage is pulled toward higher voltage due to a gate-to-drain capacitance of the N-type transistor 30, thereby further prolonging a time period until the N-type transistor 30 is switched off. Also, as the drain voltage Vd rises when the gate voltage (drive signal GD) is close to the threshold voltage, there is a possibility that the N-type transistor 30 that has been switched off is switched on again due to the gate voltage being pulled up. If the N-type transistor 30 is switched on again, the PWM waveform is disordered. This gives rise to a possibility that the output voltage VOUT of the switching regulator becomes unstable.

2. Control Circuit for Switching Regulator

Figure 3:
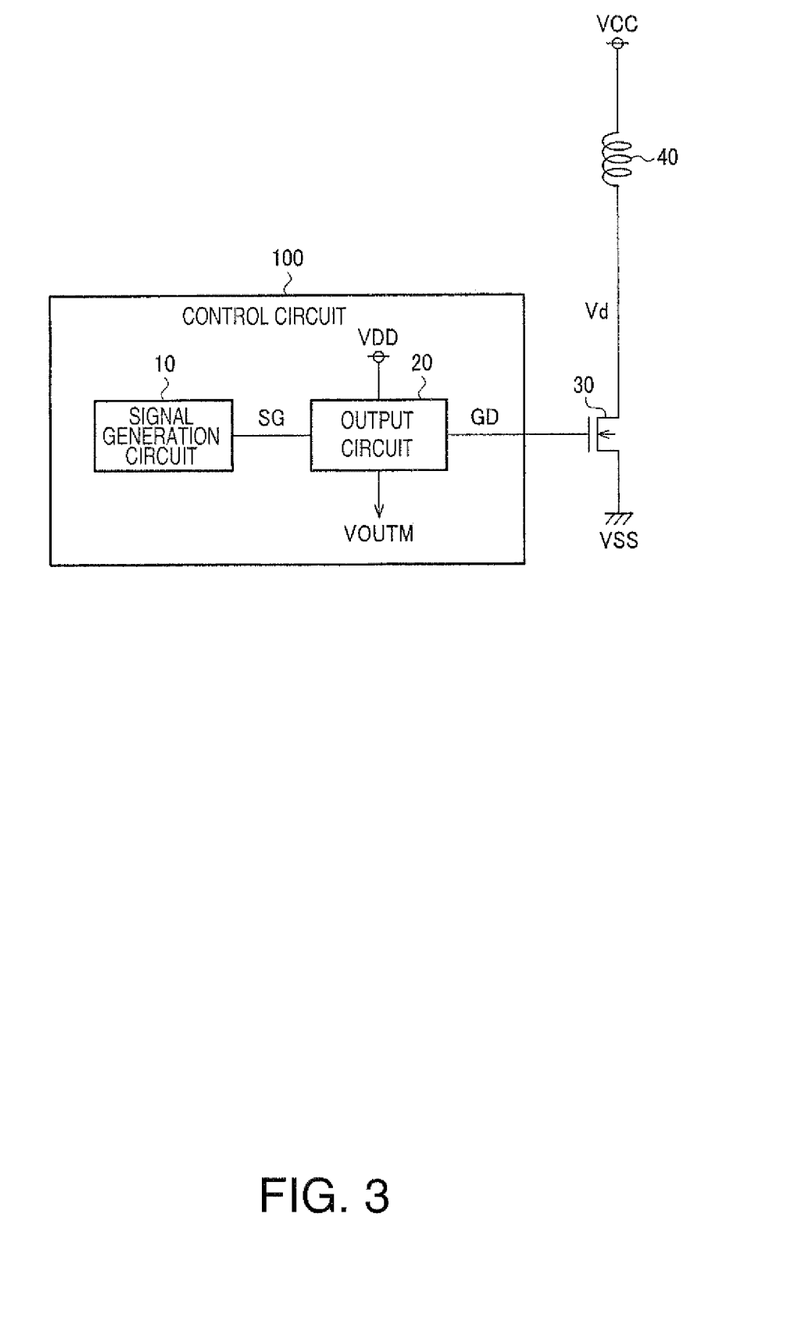
FIG. 3 shows an example of a configuration of a control circuit for the switching regulator according to the present embodiment.

FIG. 3 shows an example of a configuration of a control circuit for a switching regulator according to the present embodiment that can solve the aforementioned problems. In FIG. 3, a control circuit 100 includes a signal generation circuit 10 and an output circuit 20. The signal generation circuit 10 generates a control signal SG for the switching regulator. Upon receiving the control signal SG, the output circuit 20 outputs a drive signal GD to a gate of an N-type transistor 30 that drives an inductor 40.

The output circuit 20 outputs a voltage lower than a source voltage of the N-type transistor 30 as an off-voltage level of the drive signal GD for switching off the N-type transistor 30 (that is to say, the low level of the drive signal GD). More specifically, a source of the N—type transistor 30 is connected to a node of a ground voltage VSS. On the other hand, a voltage VOUTM lower than the ground voltage VSS is supplied to the output circuit 20. The output circuit 20 outputs the voltage VOUTM lower than the source voltage of the N-type transistor 30 as the low level of the drive signal GD.

This makes it possible to steepen the waveform of the drive signal GD at the time of switching off the N-type transistor 30, and hence to reduce a time period required to switch the N-type transistor 30 from on to off. As a result, the efficiency of the switching regulator can be improved, and the N-type transistor 30 can be prevented from being switched on again.

In FIG. 3, the source voltage of the N-type transistor 30 is the ground voltage VSS. However, in the present embodiment, it is sufficient that the voltage VOUTM is lower than the source voltage of the N-type transistor 30, and the source voltage of the N-type transistor 30 is not limited to the ground voltage VSS. Furthermore, in FIG. 3, a power supply voltage VDD is supplied to the output circuit 20, and a power supply voltage VCC from a power supply different from a power supply of the power supply voltage VDD is supplied to one end of the inductor 40. However, the present embodiment is not limited in this way, and a power supply voltage VDD from a common power supply may be supplied to the output circuit 20 and one end of the inductor 40.

3. Detailed Configuration

Figure 4:
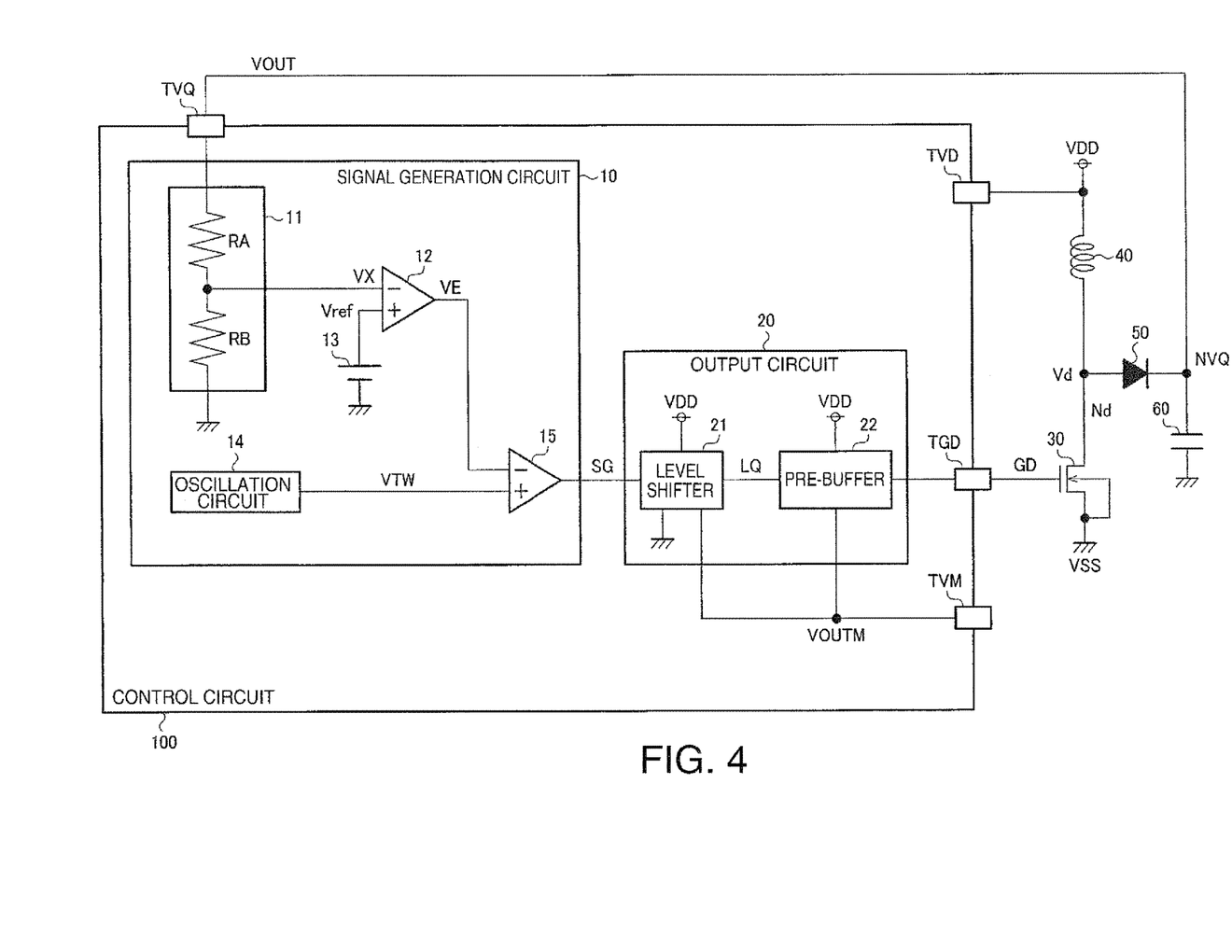
FIG. 4 shows an example of a detailed configuration of the control circuit for the switching regulator according to the present embodiment.

FIG. 4 shows an example of a detailed configuration of the control circuit for the switching regulator according to the present embodiment. In FIG. 4, the control circuit 100 includes the signal generation circuit 10 and the output circuit 20. The signal generation circuit 10 includes a voltage dividing circuit 11, an error amplification circuit 12 (error amplifier), a reference voltage generation circuit 13, an oscillation circuit 14 (triangle wave generation circuit), and a comparison circuit 15 (comparator). On the other hand, the output circuit 20 includes a level shifter 21 and a pre-buffer 22. Note that the constituent elements that are the same as the constituent elements described with reference to FIG. 1 are given the same reference signs thereas, and a description thereof is omitted as appropriate.

The comparison circuit 15 outputs the control signal SG with the power supply voltage VDD as the high level (a high power supply voltage, for example, 3.3 V), and the ground voltage VSS as the low level (a low power supply voltage). The negative-potential voltage VOUTM (for example, −3.3 V) is input to the level shifter 21 from a terminal TVM. The level shifter 21 shifts the voltage level of the control signal SG, and outputs a signal LQ with the power supply voltage VDD as the high level and the voltage VOUTM as the low level. For example, the level shifter 21 performs non-inverted output, that is to say, outputs the high-level signal LQ with respect to the high-level control signal SG. Alternatively, the level shifter 21 may perform inverted output, that is to say, output the low-level signal LQ with respect to the high-level control signal SG.

The negative voltage VOUTM is input to the pre-buffer 22 from the terminal TVM. The pre-buffer 22 buffers the signal LQ and outputs, to the gate of the N-type transistor 30, the drive signal GD with the power supply voltage VDD as the high level and the voltage VOUTM as the low level.

Note that the constituent elements of the control circuit 100 may be integrated as an integrated circuit device, or may be constituted by discrete circuit elements. In the case where the control circuit 100 is constituted as the integrated circuit device, the voltage VOUTM may be supplied from the outside via the terminal TVM as shown in FIG. 4, or may be generated internally as will be described later with reference to FIG. 8.

Figure 5:
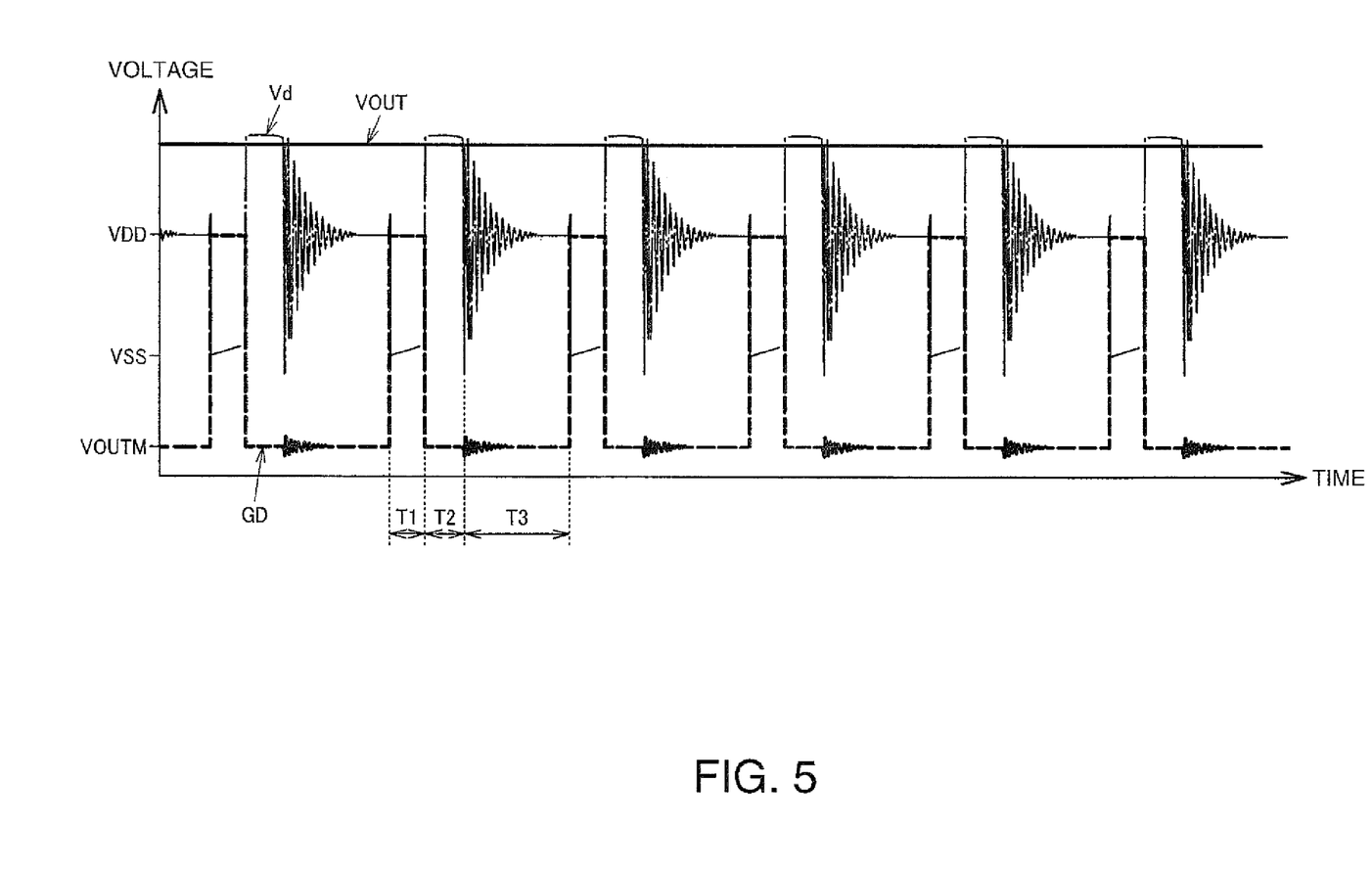
FIG. 5 is a diagram for describing operations in the example of the detailed configuration.

FIG. 5 shows a simulation waveform of the switching regulator shown in FIG. 4 to which the control circuit 100 is applied. As shown in FIG. 5, during a time period T1, the output circuit 20 outputs the high-level drive signal GD (VDD), the N-type transistor 30 is switched on, and current flows from the node of the power supply voltage VDD into the node of the ground voltage VSS via the inductor 40 and the N-type transistor 30. The current flowing in the inductor 40 increases over time. During the time period T1, a drain voltage Vd of the N-type transistor 30 is close to the ground voltage VSS.

During time periods T2, T3 that follow the time period T1, the output circuit 20 outputs the low-level drive signal GD (VOUTM), and the N-type transistor 30 is switched off. First, during the time period T2, current flows from the node of the power supply voltage VDD into a capacitor 60 via the inductor 40 and a diode 50. At this time, current flowing from the inductor 40 decreases over time. Therefore, the drain voltage Vd becomes higher than the power supply voltage VDD, and the output voltage VOUT (for example, 6 V) higher, than the power supply voltage VDD (for example, 3.3 V) can be obtained. The output voltage VOUT is smoothed by the capacitor 60. From the time period T1 through the time period T3, a substantially constant output voltage VOUT is output.

When a load (current load) of the switching regulator is relatively small, current from the inductor 40 to the capacitor 60 becomes zero in the middle of a time period in which the N-type transistor 30 is off. This operation mode is referred to as a current intermittence mode. During the time period T3, current from the inductor 40 to the capacitor 60 is zero in the current intermittence mode. During the time period T3, ringing occurs in the drain voltage Vd, and the drain voltage Vd gradually approaches the power supply voltage VDD. Thereafter, the time periods T1 to T3 are repeated. Here, the signal generation circuit 10 applies PWM control to the length of the time period T1. As has been described earlier, the length of the time period T1 is controlled so as to keep the output voltage VOUT constant.

Figure 6:
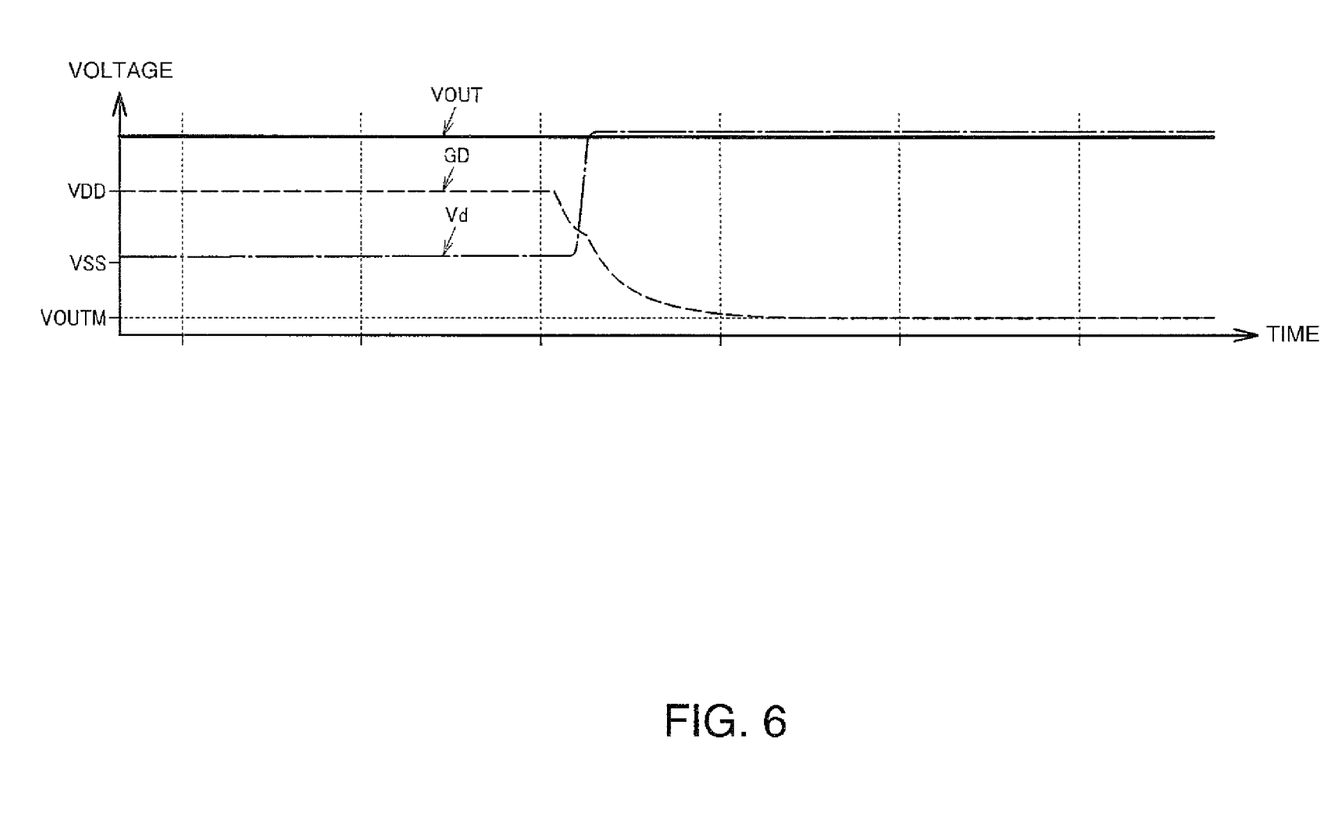
FIG. 6 is a diagram for describing the operations in the example of the detailed configuration.

FIG. 6 shows voltage changes in the drive signal GD and the drain voltage Vd of the N-type transistor 30 when the N-type transistor 30 is switched from on to off in the switching regulator shown in FIG. 4. Note that one interval on a horizontal axis in FIG. 6 indicates the same time period as one interval on a horizontal axis in FIG. 2.

As shown in FIG. 6, as a result of setting the low level of the drive signal GD at the negative voltage VOUTM, the waveform at the time when the gate voltage of the N-type transistor 30 is switched from the high level to the low level is steep compared to the comparative example shown in FIG. 2. That is to say, a time period until the gate voltage shifts from the power supply voltage VDD to a threshold voltage (for example, approximately 0.7 V) can be reduced, and the power efficiency of the switching regulator can be improved. Furthermore, the effect exerted on the gate voltage when the drain voltage Vd rapidly increases from around the ground voltage VSS to the output voltage VOUT (for example, 6 V) is small compared to the comparative example shown in FIG. 2. That is to say, the possibility that the N-type transistor 30 is switched on again can be reduced, and the output voltage VOUT can be kept at a more stable, constant voltage.

In the embodiment described above, the output circuit 20 outputs the negative voltage (voltage VOUTM) as the off-voltage for switching off the N-type transistor 30.

The source of the N-type transistor 30 that drives the inductor 40 is generally set at a voltage serving as a reference for the potential (0 V, for example, the ground voltage VSS). In this case, by applying the voltage VOUTM, which is negative with respect to the voltage serving as the reference (0 V), to the gate of the N-type transistor 30, the N-type transistor 30 can be switched off by a voltage lower than the source voltage of the N-type transistor 30. In this way, the power efficiency can be improved and the output voltage VOUT can be stabilized as described above.

Furthermore, in the present embodiment, the control circuit 100 includes the terminal TVM to which a voltage (voltage VOUTM) lower than the source voltage of the N-type transistor 30 is supplied. The output circuit 20 outputs the off-voltage (voltage VOUTM) for switching off the N-type transistor 30 based on the voltage level (voltage VOUTM) on the terminal TVM.

In this way, for example, the negative voltage used in a system and the like including the switching regulator according to the present embodiment can be supplied to the control circuit 100 via the terminal TVM. Consequently, using the negative voltage of the system and the like, a negative voltage can be output as the low level of the drive signal GD.

4. Detailed Configuration of Output Circuit

Figure 7:
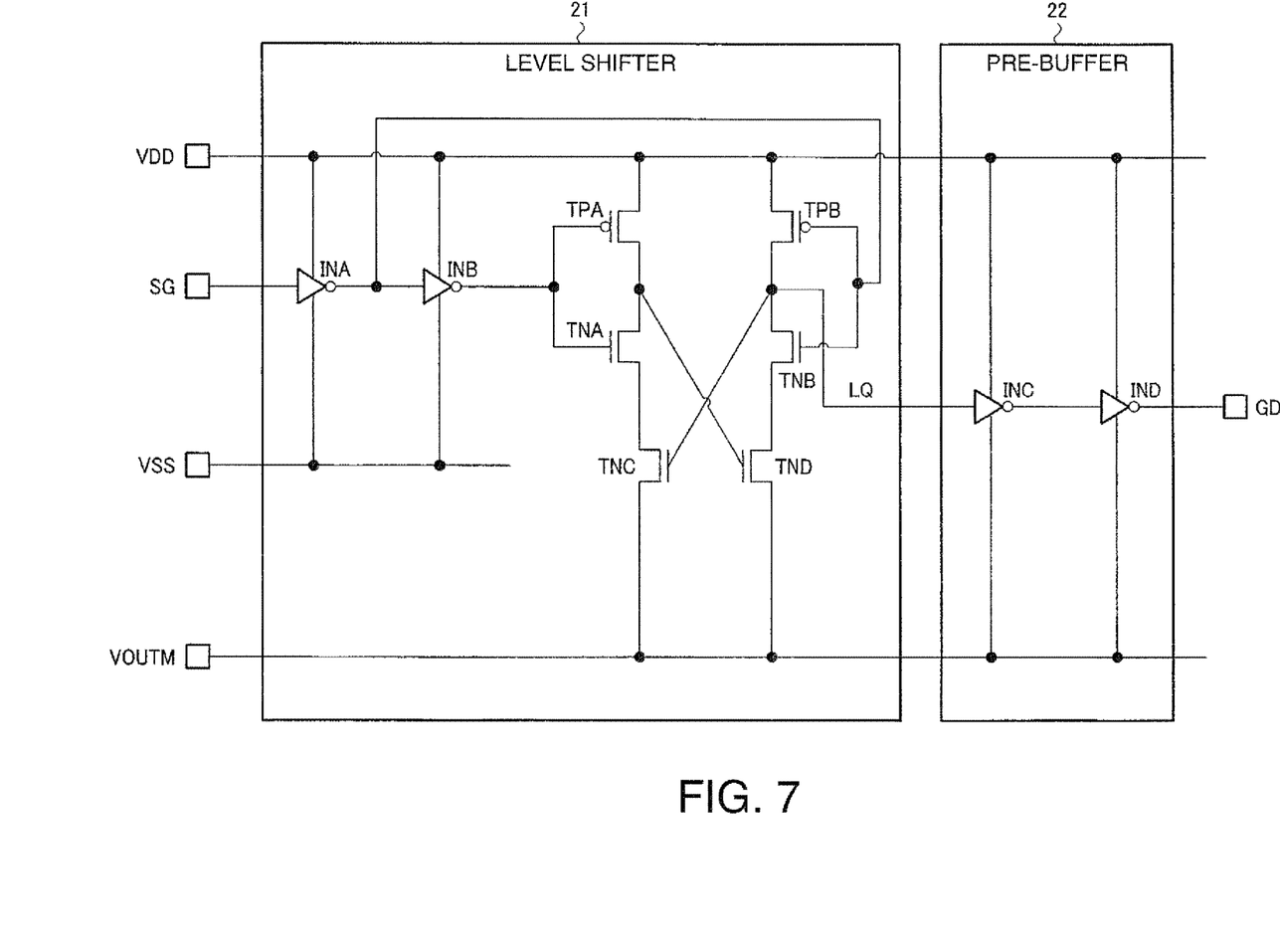
FIG. 7 shows an example of a detailed configuration of an output circuit.

FIG. 7 shows an example of a detailed configuration of the output circuit 20. The output circuit 20 includes the level shifter 21 and the pre-buffer 22. The level shifter 21 includes inverters INA, INB, P-type transistors TPA, TPB, and N-type transistors TNA to TNT. The pre-buffer 22 includes inverters INC, IND.

The inverters INA, INE in the level shifter 21 operate with the power supply voltage VDD and the ground voltage VSS. A cross-coupling section constituted by the transistors TPA, TPB, TNA to TND operates with the power supply voltage VDD and the negative voltage VOUTM.

When the high-level control signal SG (VDD) is input to the inverter INA, the ground voltage VSS is input to the gates of the transistors TPB, TNB, and therefore the gate voltage of the transistor TNT rises toward the power supply voltage VDD. As the power supply voltage VDD is input to the gates of the transistors TPA, TNA, the gate of the transistor TND is set at the voltage VOUTM, and the signal LQ is settled at the high level (VDD).

On the other hand, when the low-level control signal SG (VSS) is input to the inverter INA, the ground voltage VSS is input to the gates of the transistors TPA, TNA, and therefore the gate voltage of the transistor TND rises toward the power supply voltage VDD. As the power supply voltage VDD is input to the gates of the transistors TPB, TNB, the gate of the transistor TNT is set at the voltage VOUTM, and the signal LQ is settled at the low level (VOUTM).

The inverters INC, IND in the pre-buffer 22 output the voltage level of the signal LQ as the voltage level of the drive signal GD. For example, it is sufficient to set the driving ability of the inverter IND higher than the driving ability of the inverter INC so as to provide a sufficient ability to drive the gate of the N-type transistor 30.

5. Modification Example of Control Circuit

Figure 8:
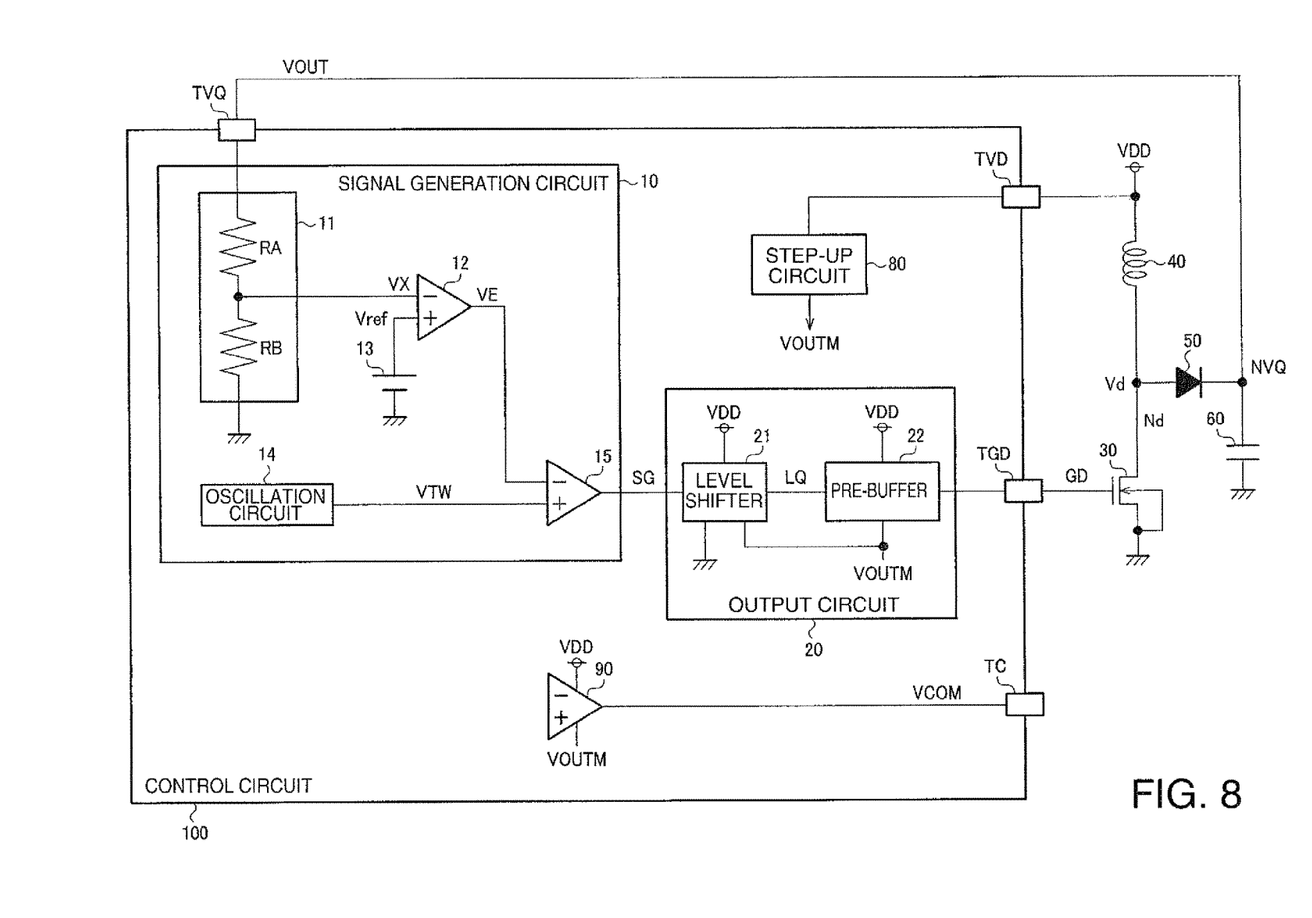
FIG. 8 shows a modification example of the control circuit for the switching regulator according to the present embodiment.

FIG. 8 shows a modification example of the control circuit 100. In FIG. 8, the control circuit 100 includes the signal generation circuit 10, the output circuit 20, a boosting circuit 80, and a regulator 90 (amplification circuit). Note that the constituent elements that are the same as the constituent elements described with reference to FIGS. 1, 3 and 4 are given the same reference signs thereas, and a description thereof is omitted as appropriate.

The boosting circuit 80 generates a voltage level lower than the source voltage of the N-type transistor 30. That is to say, the boosting circuit 80 generates the negative voltage VOUTM lower than the ground voltage VSS, and supplies the voltage VOUTM to the level shifter 21 and the pre-buffer 22 in the output circuit 20. The boosting circuit 80 is constituted by a charge pump boosting circuit that converts voltage using a switched capacitor circuit. The boosting circuit 80 converts the power supply voltage VDD supplied from the terminal TVD into the voltage VOUTM. Here, the charge pump boosting circuit is a circuit constituted by a plurality of capacitors and a plurality of switch elements connecting the same. By changing the connection relationship among the capacitors via on/off of the switch elements, charging of the capacitors and re-distribution of charge to the capacitors are repeated. As a result, voltage is converted.

The output circuit 20 operates with the negative voltage VOUTM supplied from the boosting circuit 80, converts the voltage level of the control signal SG from the comparison circuit 15 to the voltage level of the drive signal GD, and drives the N-type transistor 30 with the drive signal GD.

The regulator 90 outputs a predetermined voltage to a terminal TC based on the power supply voltage VDD from the terminal TVD and on the negative voltage VOUTM from the boosting circuit 80. The predetermined voltage is within a range from the power supply voltage VDD to the voltage VOUTM. For example, in the case where the switching regulator is applied to a power supply of a driver for an electrooptical panel as will be described later with reference to FIG. 11 and the like, the regulator 90 may generate a common voltage VCOM from the power supply voltage VDD and the voltage VOUTM. The common voltage VCOM is supplied to one of electrodes of an electrooptical element constituting a pixel.

In the embodiment described above, the control circuit 100 for the switching regulator includes the boosting circuit 80 that generates a voltage lower than the source voltage of the N-type transistor 30. The output circuit 20 outputs the off-voltage (voltage VOUTM) for switching off the N-type transistor 30 based on the output from the boosting circuit 80.

In this way, for example, in the case where a power supply that generates a negative voltage is built in an integrated circuit device including the control circuit 100, the off-voltage for the N-type transistor 30 can be generated using the negative voltage. For example, in a driver for an electrooptical panel and the like, various types of voltages, including the negative voltage (see, for example, FIG. 12), are required to drive the electrooptical panel.

6. Modification Examples of Switching Regulator

The description of the embodiment has been given using the example in which the switching regulator is a positive-polarity boosting circuit. However, the present embodiment is not limited in this way.

Figure 9:
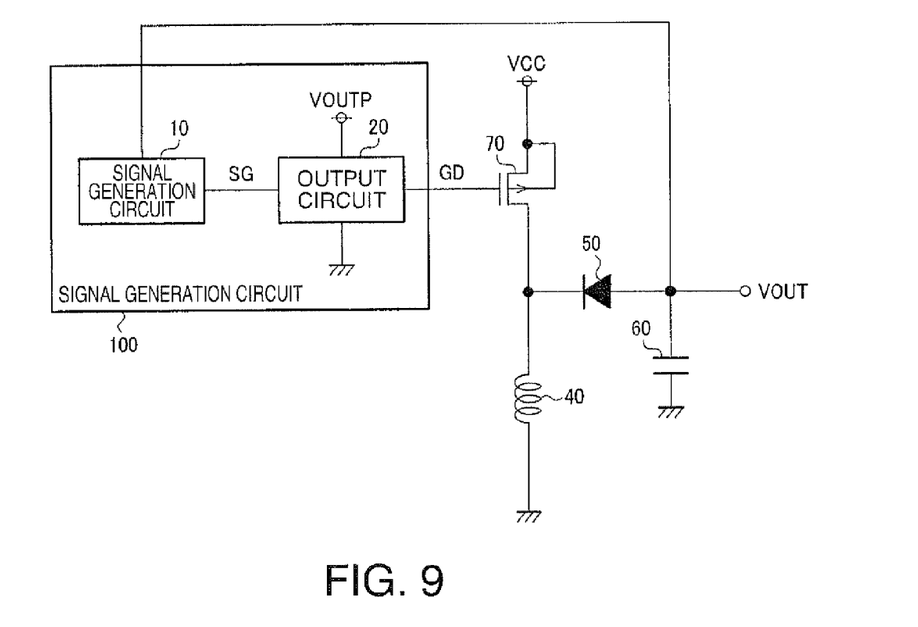
FIG. 9 shows a first modification example of the switching regulator according to the present embodiment.

FIG. 9 shows a first modification example of the switching regulator. In FIG. 9, the switching regulator includes the control circuit 100, a P-type transistor 70, the inductor 40, the diode 50, and the capacitor 60. The control circuit 100 includes the signal generation circuit 10 and the output circuit 20.

This switching regulator is an opposite-polarity boosting circuit. That is to say, when the P-type transistor 70 is on, current flows into the inductor 40 via the P-type transistor 70. On the other hand, when the P-type transistor 70 is off, current flows from the capacitor 60 into the inductor 40 via the diode 50, and therefore the output voltage VOUT becomes lower than the ground voltage VSS (for example, VCC=3.3 V, VOUT=−6V). The PWM control executed by the signal generation circuit 10 keeps the output voltage VOUT constant.

Figure 10:
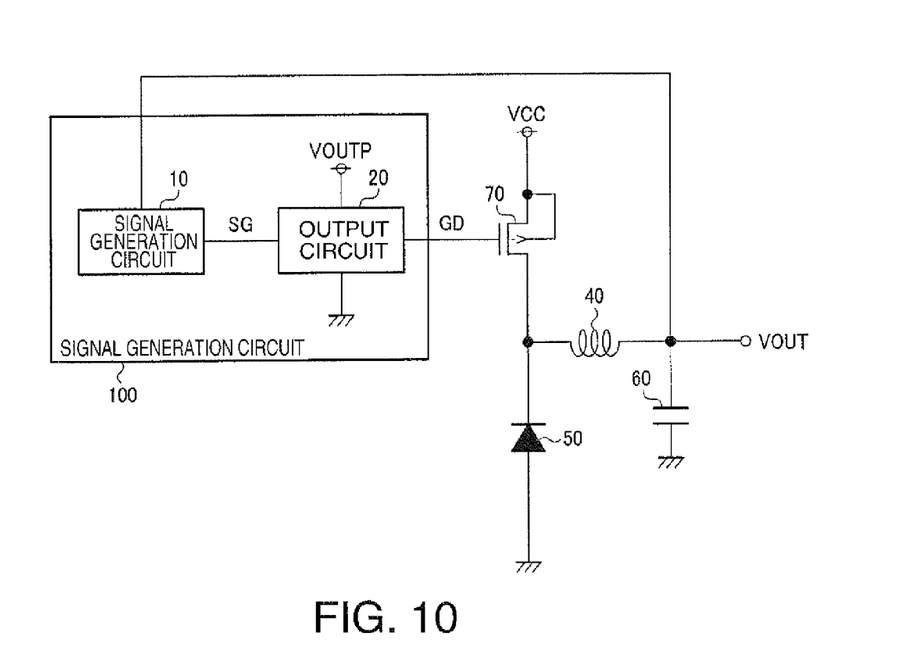
FIG. 10 shows a second modification example of the switching regulator according to the present embodiment.

FIG. 10 shows a second modification example of the switching regulator. In FIG. 10, the switching regulator includes the control circuit 100, the P-type transistor 70, the inductor 40, the diode 50, and the capacitor 60. The control circuit 100 includes the signal generation circuit 10 and the output circuit 20.

This switching regulator is a step-down circuit. That is to say, when the P-type transistor 70 is on, current flows from the inductor 40 into the capacitor 60 via the P-type transistor 70. At this time, a potential difference between both ends of the inductor 40 does not exceed VCC. On the other hand, when the P-type transistor 70 is off, current flows from the inductor 40 to the capacitor 60 via the diode 50. At this time, the potential difference between both ends of the inductor 40 is inverted but does not exceed VCC, and therefore the output voltage VOUT becomes lower than the power supply voltage VCC (for example, VCC=3.3 V, VOUT=2.0 V). The PWM control executed by the signal generation circuit 10 keeps the output voltage VOUT constant.

In the first and second modification examples, the control circuit 100 includes the signal generation circuit 10 and the output circuit 20. The signal generation circuit 10 generates the control signal SO for the switching regulator. Upon receiving the control signal SG, the output circuit 20 outputs the drive signal GD to a gate of the P-type transistor 70 that drives the inductor 40. The output circuit 20 also outputs a voltage (voltage VOUTP) higher than the source voltage of the P-type transistor 70 (power supply voltage VCC) as an off-voltage of the drive signal GD for switching off the P-type transistor 70.

By thus switching off the P-type transistor 70 with the voltage VOUTP higher than the source voltage of the P-type transistor 70, it is possible to, for example, reduce a time period of the shift from on to off and improve the efficiency of the switching regulator, similarly to the case of the N-type transistor 30.

Note that in order to switch on the P-type transistor 70, it is sufficient to, for example, output the drive signal GD of the ground voltage VSS. Also, the voltage VOUTP may be input from the outside of the control circuit 100 via a terminal, or may be generated by a power supply circuit built in the control circuit 100. Furthermore, the power supply voltage VCC may be supplied from a common power supply that supplies the power supply voltage VDD for the control circuit 100, or may be supplied from a separate power supply.

7. Electronic Device

Figure 11:
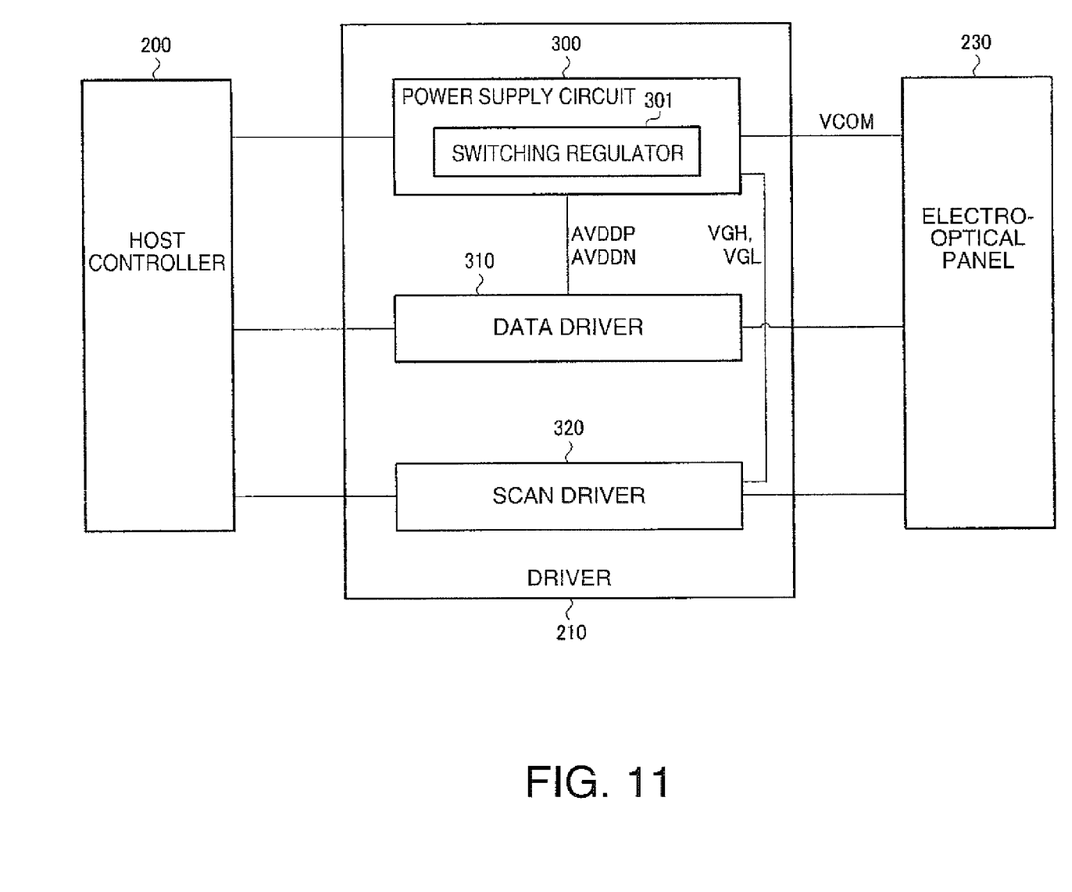
FIG. 11 shows an example of a configuration of an electronic device.

FIG. 11 shows an example of a configuration of an electronic device to which the switching regulator according to the present embodiment is applied. Note that the following describes an example in which the switching regulator is applied to a driver that drives an electrooptical panel. However, the present embodiment is not limited in this way, and the switching regulator can be applied to various types of electronic devices that supply power using the switching regulator.

In FIG. 11, the electronic device includes an electrooptical panel 230 that displays images, a driver 210 that drives the electrooptical panel 230, and a host controller 200 that controls the driver 210. One conceivable example of the electronic device is a mobile terminal such as a mobile telephone terminal and a smartphone. One conceivable example of the host controller 200 is a baseband engine that communicates with a base station via an antenna.

The electrooptical panel 230 is an active-matrix liquid crystal panel in which pixels constituted by liquid crystals and transistors (for example, TFTs (thin-film transistors)) are arrayed in a matrix on a substrate (glass substrate). Alternatively, the electrooptical panel 230 may be a passive-matrix liquid crystal panel, or a display panel other than a liquid crystal panel, such as an EL (electro-luminescence) panel.

The driver 210 includes a power supply circuit 300 provided with a switching regulator 301, a data driver 310 (source driver) that drives data lines (source lines) of the electrooptical panel 230, and a scan driver 320 (gate driver) that selects scan lines (gate lines) of the electrooptical panel 230. The driver 210 is constituted as, for example, an integrated circuit device. Although omitted from the drawings, an inductor and the like used in the switching regulator 301 are disposed outside the integrated circuit device as external components.

Figure 12:
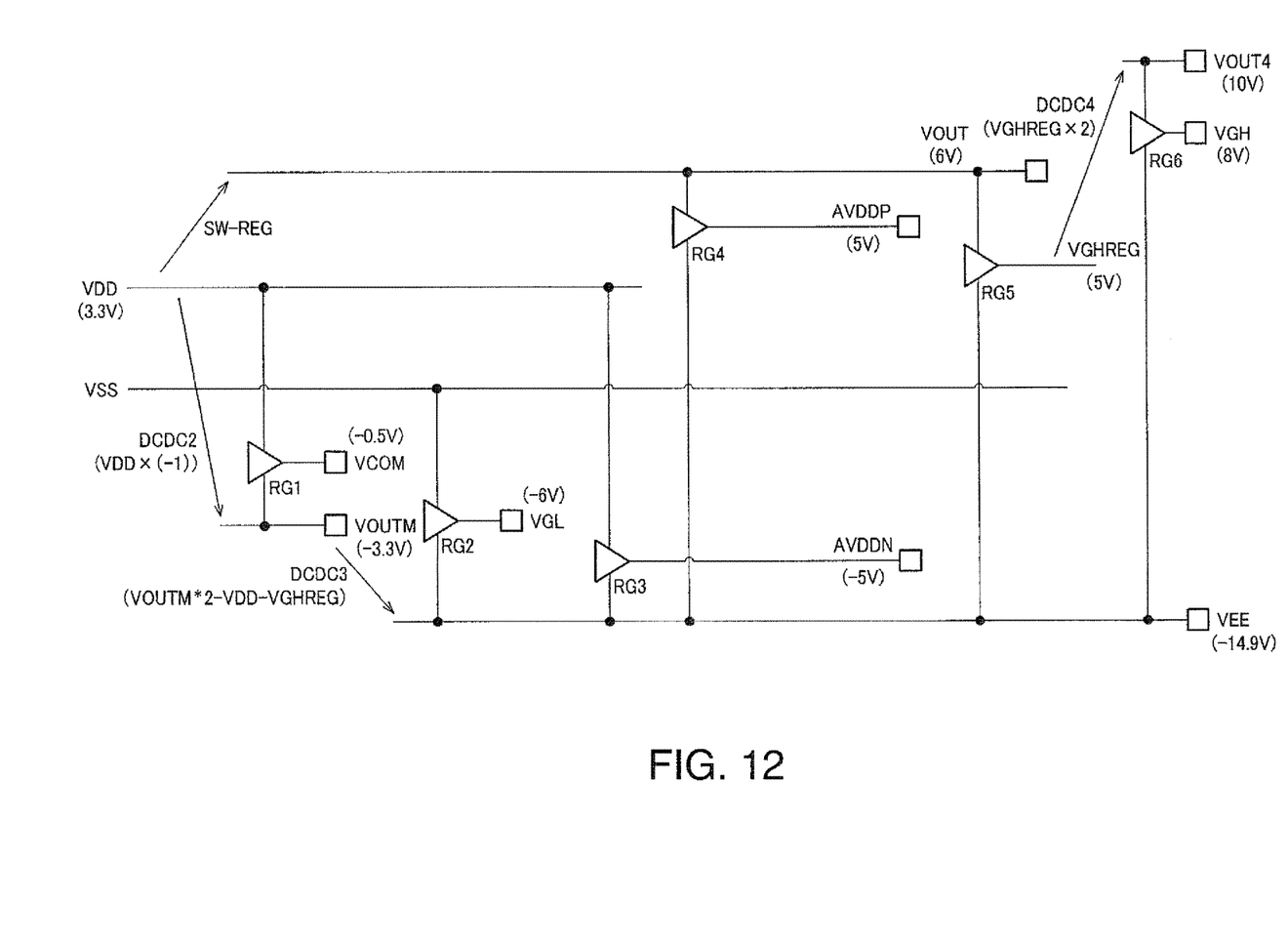
FIG. 12 shows an example of a configuration of a power supply system for the electronic device.

FIG. 12 shows an example of a system configuration of a power supply generated by the power supply circuit 300. The power supply circuit 300 includes the switching regulator 301 (SW-REG) charge pump type boosting circuits DCDC2 to DCDC4, and regulators RG1 to RG6.

The boosting circuit DCDC2 generates a voltage VOUTM=−3.3 V by inversely boosting a power supply voltage VDD=3.3 V of a system of the electronic device. The regulator RG1 generates a common voltage VCOM=−0.5 V from the voltage VOUTM and the voltage VDD. The common voltage VCOM is supplied to common electrodes of the pixels arrayed in a matrix.

The boosting circuit DCDC3 generates a voltage VEE=−14.9 V based on the voltage VOUTM, the voltage VDD, and a later-described voltage VGHREG. The regulator RG2 generates a voltage VGL=−6 V from the voltage VEE and the voltage VDD. A gate voltage VGL is a low-level voltage supplied to gates of transistors that select pixels. The regulator RG3 generates a data line driving voltage AVDDN=−5 V from the voltage VEE and the voltage VDD. The data line driving voltage AVDDN is a power supply voltage of an amplifier that drives the data lines with negative polarity.

The switching regulator 301 (SW-REG) generates a voltage VOUT=6 V by stepping up the voltage VDD. The regulator RG4 generates a data line driving voltage AVDDP=5 V from the voltage VOUT and the voltage VEE. The data line driving voltage AVDDP is a power supply voltage of an amplifier that drives the data lines with positive polarity. The regulator RG5 generates a voltage VGHREG=5 V from the voltage VOUT and the voltage VEE.

The boosting circuit DCDC4 generates a voltage VOUT4=10 V by boosting the voltage VGHREG. The regulator RG6 generates a gate voltage VGH=8 V from the voltage VOUT4 and the voltage VEE. The gate voltage VGH is a high-level voltage supplied to gates of transistors that select pixels.

The data driver 310 drives the data lines of the electrooptical panel 230 based on the data line driving voltages AVDDP, AVDDN generated by the power supply circuit 300. For example, the data driver 310 executes dot inversion driving in which neighboring data lines are driven while inverting their polarities such that they alternate between positive and negative polarities. The technique of the dot inversion driving works as follows. For example, in the case where there are RGB data lines, R and B data lines are driven with positive polarity (a range from AVDDP to VCOM), and G data lines are driven with negative polarity (a range from AVDDN to VCOM).

More specifically, the host controller 200 inputs a horizontal synchronization signal, a dot clock, and image data synchronized with the dot clock to the data driver 310. The data driver 310 latches image data for each scan line based on the horizontal synchronization signal and the dot clock. The data driver 310 also generates a tone voltage using the voltages AVDDP, AVDDN. Then, a tone voltage corresponding to latched image data is selected for each data line using a D/A converter, amplified by data line driving amplifiers, and then output to the data line. The data line driving amplifiers include a positive-polarity amplifier and a negative-polarity amplifier that use the voltage AVDDP and the voltage AVDDN as power supplies, respectively. One of these amplifiers is selected in accordance with the dot inversion driving.

The scan driver 320 selects scan lines of the electrooptical panel 230 based on the gate voltages VGH, VGL generated by the power supply circuit 300. More specifically, the host controller 200 inputs a vertical synchronization signal and a horizontal synchronization signal to the scan driver 320. The scan driver 320 activates the scan lines (for example, the gate voltage VGH) selected based on the vertical synchronization signal and the horizontal synchronization signal. In the electrooptical panel 230, transistors of pixels that are connected to the selected scan lines are switched on, and a data voltage is written into the pixels via the data lines.

As described above, the power supply circuit 300 in the driver 210 are provided with various types of boosting circuits and regulators for driving the electrooptical panel 230, including the boosting circuit DCDC2 that generates the negative-potential voltage VOUTM. By using the output from the boosting circuit DCDC2 which is originally provided in the circuit, the N-type transistor 30 that drives the inductor 40 in the switching regulator can be switched off with the voltage VOUTM lower than the source voltage.

While the present embodiment has been described above in detail, a person skilled in the art should be able to easily understand that many modifications are possible without substantially departing from new matters and effects of the invention. Therefore, all examples of such modifications are to be embraced within the scope of the invention. For example, terms that are used at least once in the description or the drawings in conjunction with different terms having broader or similar meanings can be replaced with the different terms in any portion of the description or the drawings. Also, any combination of the present embodiment and modification examples is embraced within the scope of the invention. Furthermore, the configurations and operations of the control circuit, switching regulator, power supply circuit, driver, and electronic device, the technique to control the switching regulator, and the like are not limited to those described in the present embodiment. They can be implemented with various modifications.

What is claimed is:

1. A control circuit for a switching regulator, comprising:
a signal generation circuit that generates a control signal for the switching regulator, the control signal having a voltage level of a high power supply voltage and a voltage level of a low power supply voltage;
a boosting circuit that generates a voltage lower than the low power supply voltage; and
an output circuit that outputs a drive signal to a gate of an N-type transistor, the N-type transistor driving an inductor upon receiving the drive signal and a having a source at the low power supply voltage, the output circuit outputting the voltage lower than the low power supply voltage as an off-voltage of the drive signal for switching off the N-type transistor, the output circuit including:
a level shifter that converts the control signal into a signal having the voltage level of the high power supply voltage and voltage level of the voltage lower than the low power supply voltage.

2. The control circuit according to claim 1, wherein the output circuit outputs a negative voltage as the off-voltage for switching off the N-type transistor.

3. An integrated circuit device comprising the control circuit according to claim 2.

4. A driver that drives an electrooptical panel comprising the control circuit according to claim 2.

5. The control circuit according to claim 1, wherein the boosting circuit is a charge pump type boosting circuit that converts a voltage using a switched capacitor circuit.

6. The control circuit according to claim 1, further comprising
a terminal to which the voltage lower than the lower power supply voltage is supplied, wherein the output circuit outputs the off-voltage for switching off the N-type transistor based on a voltage on the terminal.

7. An integrated circuit device comprising the control circuit according to claim 6.

8. A driver that drives an electrooptical panel comprising the control circuit according to claim 6.

9. The control circuit according to claim 1, wherein
the output circuit further includes a pre-buffer that outputs the drive signal based on the signal from the level shifter.

10. An integrated circuit device comprising the control circuit according to claim 1.

11. A driver that drives an electrooptical panel comprising the control circuit according to claim 1.

12. A switching regulator comprising:
the control circuit according to claim 1;
the inductor; and
the N-type transistor.

13. An electronic device comprising the switching regulator according to claim 12.

14. The control circuit according to claim 1, wherein the level shifter includes cross-coupled transistors that selectively connect the gate of the N-type transistor to either the high power supply voltage or the voltage lower than the low power supply voltage.

15. A control circuit for a switching regulator, comprising:
a signal generation circuit that generates a control signal for the switching regulator, the control signal having a voltage level of a high power supply voltage and a voltage level of a low power supply voltage;
a boosting circuit that generates a voltage higher than the high power supply voltage; and
an output circuit that outputs a drive signal to a gate of a P-type transistor, the P-type transistor driving an inductor upon receiving the drive signal and having a source at the high power supply voltage, the output circuit outputting the voltage higher than the high power supply voltage as an off-voltage of the drive signal for switching off the P-type transistor, the output circuit including:
a level shifter that converts the control signal into a signal having the voltage level of the low power supply voltage and a voltage level of the voltage higher than then high power supply voltage.

16. An integrated circuit device comprising the control circuit according to claim 15.

17. A driver that drives an electrooptical panel comprising the control circuit according to claim 15.

18. A switching regulator comprising:
the control circuit according to claim 15;
the inductor; and
the P-type transistor.

19. An electronic device comprising the switching regulator according to claim 18.

20. The control circuit according to claim 15, wherein the level shifter includes cross-coupled transistors that selectively connect the gate of the P-type transistor to either the low power supply voltage or the voltage higher than the high power supply voltage.

* * * * *